(12) United States Patent
Yamashita et al.

(10) Patent No.: US 9,132,732 B2
(45) Date of Patent: Sep. 15, 2015

(54) CHARGING PORT STRUCTURE AND STRADDLED VEHICLE

(75) Inventors: Yusaku Yamashita, Wako (JP); Hiroshi Iwakami, Wako (JP); Hiroyuki Shinmura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 202 days.

(21) Appl. No.: 13/702,909

(22) PCT Filed: Jun. 9, 2011

(86) PCT No.: PCT/JP2011/063260
§ 371 (c)(1),
(2), (4) Date: Feb. 22, 2013

(87) PCT Pub. No.: WO2012/002127
PCT Pub. Date: Jan. 5, 2012

(65) Prior Publication Data
US 2013/0143432 A1 Jun. 6, 2013

(30) Foreign Application Priority Data

Jun. 28, 2010 (JP) .................................. 2010-146192

(51) Int. Cl.
*B60L 1/00* (2006.01)
*B60L 11/18* (2006.01)
(Continued)

(52) U.S. Cl.
CPC ............. *B60L 1/006* (2013.01); *B60L 11/1818* (2013.01); *B60L 11/1874* (2013.01); *B60L 11/1877* (2013.01); *B62K 11/10* (2013.01); *H01M 2/0469* (2013.01); *H01M 2/1061* (2013.01); *H01R 13/447* (2013.01); *H01R 13/5213* (2013.01); *B60K 2001/0405* (2013.01);
(Continued)

(58) Field of Classification Search
CPC . Y02T 10/7088; Y02T 90/14; Y02T 10/7005; H01R 13/447; B61G 5/10
USPC ......................... 296/97.22; 180/220; 439/503
See application file for complete search history.

(56) References Cited

U.S. PATENT DOCUMENTS 4,784,610 A 11/1988 Stuart
5,080,421 A 1/1992 Otowa et al.
(Continued)

FOREIGN PATENT DOCUMENTS

CN 2637787 Y 9/2004
CN 201 376 491 Y 1/2010
(Continued)

*Primary Examiner* — Michael Zarroli
(74) *Attorney, Agent, or Firm* — Birch, Stewart, Kolasch & Birch, LLP (57) ABSTRACT

A straddled vehicle is equipped with a charging port structure in which a charging port is fixedly disposed within a recess provided in a wall member. A base end part of a cover member capable of closing the charging port is pivotably supported at a position adjacent to the charging port, and a lid is capable of closing the recess so as to cover the cover member from the outside is pivotably supported on the wall member. A retaining member retains a closed state of the lid in response to the lid being closed. A releasing member is operable so as to release the retention of the closed state of the lid by the retaining member. A coupling member is operable in association with the operation of the retaining member when closing the lid, and pivots the cover member toward the closing side.

12 Claims, 8 Drawing Sheets (51) Int. Cl.
*B62K 11/10* (2006.01)
*H01M 2/04* (2006.01)
*H01M 2/10* (2006.01)
*H01R 13/447* (2006.01)
*H01R 13/52* (2006.01)
*B61G 5/10* (2006.01)
*B60K 1/04* (2006.01)
*B62J 99/00* (2009.01)

(52) U.S. Cl.
CPC .......... *B60L 2200/12* (2013.01); *B60L 2230/12* (2013.01); *B60Y 2200/12* (2013.01); *B60Y 2200/126* (2013.01); *B61G 5/10* (2013.01); *B62J 2099/004* (2013.01); *B62K 2202/00* (2013.01); *B62K 2204/00* (2013.01); *Y02T 10/7005* (2013.01); *Y02T 10/705* (2013.01); *Y02T 10/7088* (2013.01); *Y02T 90/121* (2013.01); *Y02T 90/14* (2013.01)

(56) References Cited

U.S. PATENT DOCUMENTS

| | | | |
|---|---|---|---|
| 5,234,122 A | 8/1993 | Cherng | |
| 5,421,427 A * | 6/1995 | Ogawa et al. | 180/220 |
| 5,501,607 A | 3/1996 | Yoshioka et al. | |
| 5,540,312 A * | 7/1996 | Ogawa et al. | 191/12 R |
| 5,580,258 A * | 12/1996 | Wakata | 439/142 |
| 5,582,521 A | 12/1996 | Mori et al. | |
| 6,234,555 B1 * | 5/2001 | Emmerich et al. | 296/97.22 |
| 2002/0021017 A1 * | 2/2002 | Foltz | 296/97.22 |
| 2012/0176086 A1 | 7/2012 | Nakamura et al. | |
| 2013/0095678 A1 * | 4/2013 | Hara | 439/136 |

FOREIGN PATENT DOCUMENTS

| | | |
|---|---|---|
| EP | 0 545 813 A1 | 6/1993 |
| JP | 6-325819 A | 11/1994 |
| JP | 7-329585 A | 12/1995 |
| JP | 2005-348867 A | 12/2005 |
| JP | 2008-166140 A | 7/2008 |
| JP | 2009-27851 A | 2/2009 |
| JP | 2009-146711 A | 7/2009 |
| JP | 2009-146794 A | 7/2009 |
| JP | 4369588 B2 | 9/2009 |
| JP | 2011063066 A * | 3/2011 |
| TW | 201119890 A1 | 6/2011 |

* cited by examiner

CHARGING PORT STRUCTURE AND STRADDLED VEHICLE

TECHNICAL FIELD

The present invention relates to a charging port structure in which a charging port is fixedly disposed within a recess provided in a wall member, a base end part of a cover member that is capable of closing the charging port is pivotably supported at a position adjacent to the charging port, and a lid that is capable of closing the recess so as to cover the cover member from the outside is pivotably supported on the wall member, and a straddled vehicle equipped with such a charging port structure.

BACKGROUND ART

A charging port structure in which a cover member closing a charging port is covered by a lid is already known from Patent Document 1.

RELATED ART DOCUMENTS

Patent Documents

Patent Document 1: Japanese Patent Application Laid-open No. 6-325819

SUMMARY OF THE INVENTION

Problems to be Solved by the Invention

In the arrangement disclosed in Patent Document 1 above, the cover member and the lid are disposed so as to pivot in the same direction, and the cover member is pivoted toward a closing side by making the cover member abut against an inner face of the lid when closing the lid, thus preventing closing of the cover member from being forgotten.

However, since the cover member abuts against the inner face of the lid, not only is it necessary to use an expensive material or carry out a surface treatment in order to increase the durability of the inner face of the lid, but it is also necessary to use a hinge mechanism having high durability since a force is transmitted from the lid to the cover member due to the abutment thereof, and the cost therefore tends to rise.

The present invention has been accomplished in light of such circumstances, and it is an object thereof to provide a charging port structure that can prevent closing of a lid from being forgotten while reducing the cost of surface treatment, etc. of a cover member and the lid, and to provide a straddled vehicle utilizing effectively such a charging port structure.

Means for Solving the Problems

In order to attain the above object, according to a first aspect of the present invention, there is provided a charging port structure in which a charging port is fixedly disposed within a recess provided in a wall member, a base end part of a cover member that is capable of closing the charging port is pivotably supported at a position adjacent to the charging port, and a lid that is capable of closing the recess so as to cover the cover member from the outside is pivotably supported on the wall member, characterized in that the charging port structure comprises retaining means that operates in response to the lid being closed and retains a closed state of the lid, releasing means that is operable so as to release the retention of the closed state of the lid by the retaining means, and coupling means that is operable in association with operation of the retaining means when closing the lid and pivots the cover member toward the closing side.

Further, according to a second aspect of the present invention, in addition to the first aspect, the relative positions of the cover member and the lid are set so that the pivot trajectory of an extremity part of the cover member does not overlap the lid in the closed state.

According to a third aspect of the present invention, in addition to the first or second aspect, the coupling means is formed as a mechanical link mechanism with part of the retaining means as a component.

According to a fourth aspect of the present invention in addition to the third aspect, the link mechanism is formed from a movable part that forms part of the retaining means and operates in response to pivoting of the lid toward the closing side, and a first link that pivots the cover member toward the closing side in response to operation of the movable part when closing the lid, the releasing means is formed from a push button that is supported on the wall member so that it can be pushed, and a second link that transmits toward the movable part side a force due to a pushing-in operation of the push button, and the movable part, the first link, and the second link are connectedly need as a unit.

According a fifth aspect of the present invention, there is provided a straddled vehicle equipped with the charging port structure according to any one of the first to fourth aspects, the straddled vehicle comprising a storage box fixedly disposed beneath a riding seat provided in a substantially central portion along the fore-and-aft direction of a vehicle body, and a side cover as the wall member covering the storage box from the side, wherein the recess is provided on the side cover so as to be recessed inwardly.

According to a sixth aspect of the present invention, in addition to the fifth aspect, a cable hanger that detachably retains a charging cable is provided in a portion of the recess that is spaced from the charging port.

According to a seventh aspect of the present invention, in addition to the fifth or sixth aspect, a second recess is formed on the periphery of the charging port, the second recess being recessed further inward from the recess.

According to an eighth aspect of the present invention, in addition to any one of the fifth to seventh aspects, the retaining means is formed from a catcher that is mounted on an inner face of the lid, and a hook that is pivotably support on the side cover so as to engage with the catcher in response to closing of the lid, and a guide part for guiding movement of the catcher into the interior of the recess is provided on the side cover.

Moreover, according to a ninth aspect of the present invention, in addition to any one of the fifth to eighth aspects, one of a plurality of supporting positions supporting the side cover on a vehicle body frame is set and disposed in the vicinity of the charging port within the recess.

A side cover 48 of an embodiment corresponds to the wall member of the present invention, a link mechanism 95 of the embodiment corresponds to the coupling means of the present invention, and a hook 97 of the embodiment corresponds to the movable part of the present invention.

Effects of the Invention

In accordance with the first aspect of the present invention, when closing the lid, the retaining means operates so as to retain the closed state of the lid, and since at that time the coupling means, which operates in association with the retaining means, makes the cover member pivot toward the closing side, it is possible to prevent closing of the lid from being forgotten. Moreover, since the lid and the cover member do not directly abut against each other to transmit a force, it is unnecessary to subject the cover member and the lid to a surface treatment, etc., thus enabling the cost to be reduced.

Furthermore, in accordance with the second aspect of the present invention, since the cover member does not abut against the lid, which is in a closed state, when carrying out charging by means of the charging cable by opening the cover member it is possible to carry out the charging operation while closing the lid, thereby making it possible to prevent rain water, etc. from splashing on the charging port during charging.

In accordance with the third aspect of the present invention, since the coupling means is formed as a mechanical link mechanism, it is possible to form the charging port structure at a lower cost.

In accordance with the fourth aspect of the present invention, since the movable part, the first link, and the second link, which operate in association with each other, are formed as a unit, it is possible to form the charging port structure at a yet lower cost.

In accordance with the fifth aspect of the present invention, since the charging port structure is provided on the side cover, which covers from the side the storage box fixed and disposed beneath the riding seat, it is possible to dispose a charging port structure that requires a relatively large space by utilizing a space on a lateral side of the storage box and, moreover, it is possible to avoid protrusion of the charging port structure by a large amount from the side cover to the outside.

In accordance with the sixth aspect of the present invention, since the cable hanger detachably retaining the charging cable is provided in a recess in a portion spaced from the charging port, it is possible to decrease the weight imposed on the charging port by the charging cable during a charging operation with the charging cable, thus enabling members faulting the charging port to be formed from an inexpensive material and thereby reducing the cost.

In accordance with the seventh aspect of the present invention, since the second recess, which is recessed further inward from the recess, is formed on the periphery of the charging port, removal and insertion of the connecting terminal of the charging cable is made possible by utilizing the second recess, and the operability of charging can be improved.

In accordance with the eighth aspect of the present invention, guiding, by means of the guide part provided on the side cover, movement of the catcher mounted on the inner face of the lid so as to let the hook pivotably supported on the side cover engage therewith prevents the occurrence of a situation in which the hook becomes inoperable when closing the lid as a result of the catcher slipping under the hook due to flexure of the lid and allowing the hook to be engaged without making the hook pivot, and it is possible to prevent the catcher from slipping under when closing the lid, thereby ensuring that the hook operates by reliable engagement with the catcher and the retaining means operates reliably.

Furthermore, in accordance with the ninth aspect of the present invention, since the side cover is supported on the vehicle body frame in the vicinity of the charging port, it is possible to prevent the side cover from flexing when carrying out removal and insertion of the connecting terminal on the charging cable side, thus enabling removal and insertion operations to be carried out smoothly.

EXPLANATION OF REFERENCE NUMERALS AND SYMBOLS

38 Storage box
39 Riding seat
48 Side cover, which is a wall member
71 Recess
73 Charging port
74 Charging cable
76 Cover member
77 Lid
91 Cable hanger
92 Second recess
93 Retaining means
94 Releasing means
95 Link mechanism, which is coupling means
96 Catcher
97 Hook, which is a movable part
108 Guide part
109 First link
110 Push button
111 Second link
B Vehicle body
F Vehicle body frame

MODES FOR CARRYING OUT THE INVENTION

A mode for carrying out the present invention is explained below by reference to FIG. 1 to FIG. 8.

Embodiment 1

Figure 1:
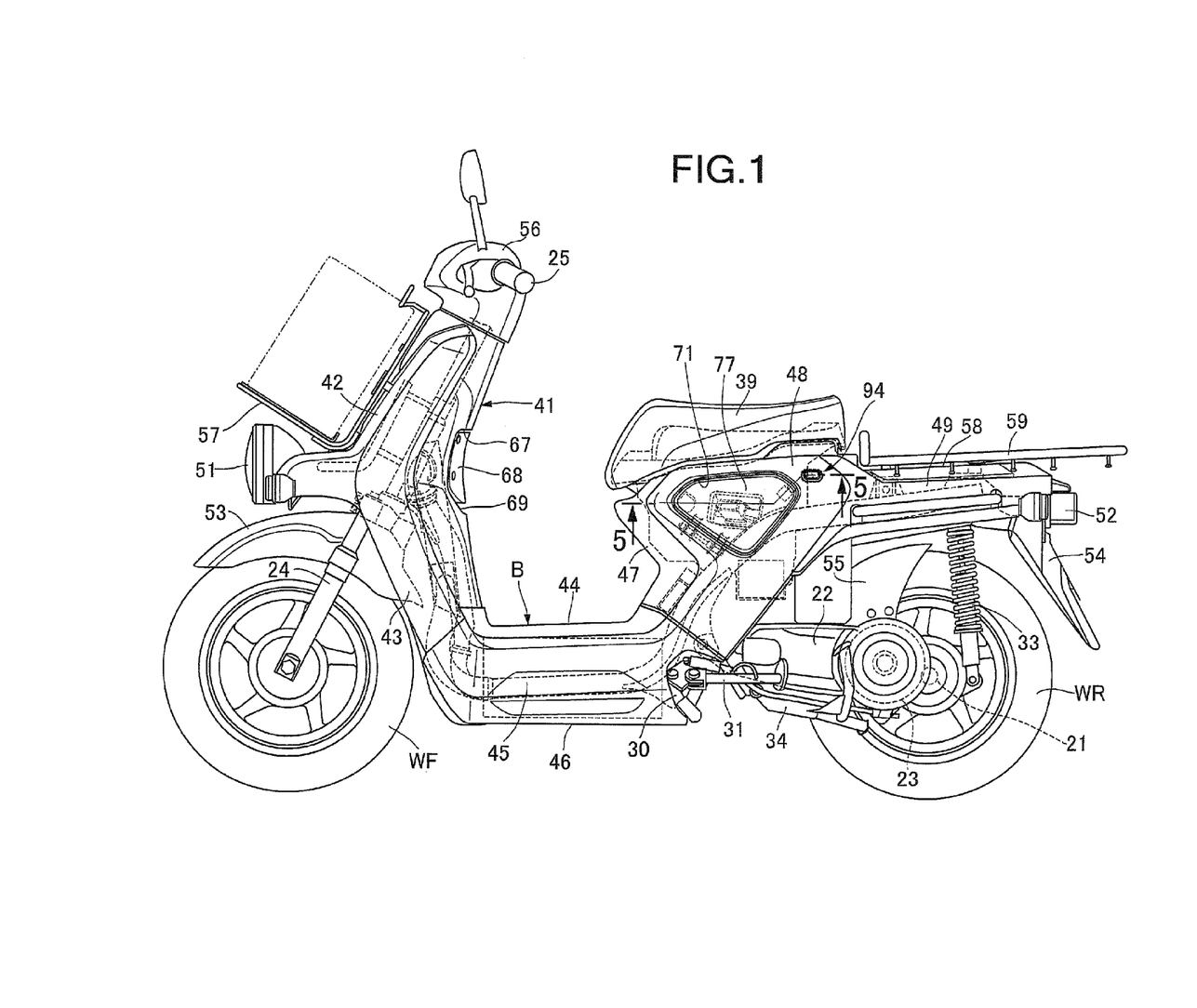
FIG. 1 is a side view of a two-wheeled electric vehicle. (first embodiment)

First, in FIG. 1, this straddled vehicle is a scooter type two-wheeled electric vehicle having a low floor 44, and is arranged so that a rear wheel WR is driven to rotate by means of rotational power exhibited by an electric motor 23 installed within a swing arm 22 axially supporting an axle 21 of the rear wheel WR via a rear part.

Figure 2:
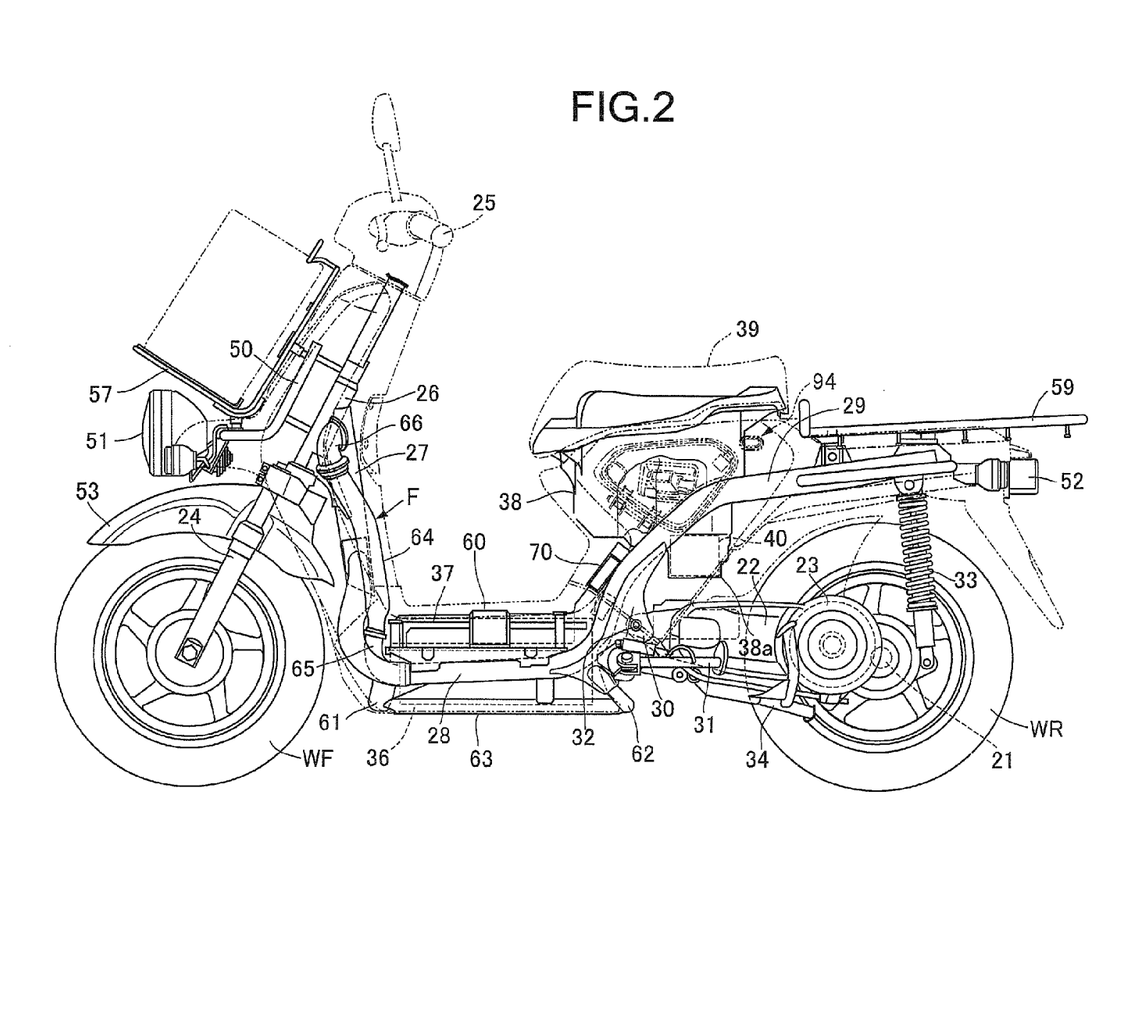
FIG. 2 is a side view of the two-wheeled electric vehicle in a state in which a vehicle body cover is omitted. (first embodiment)

Referring in addition to FIG. 2, a vehicle body frame F of this two-wheeled electric vehicle includes a head pipe 26 steerably supporting a front fork 24 axially supporting the front wheel WF and handlebars 25 linked to an upper part of the front fork 24, a down frame 27 extending downward to the rear from the head pipe 26, a pair of left and right under frames 28 linked to a lower part of the down frame 27 and extending rearward, and a pair of left and right rear frames 29 connected integrally to rear ends of the under frames 28 and extending upward to the rear.

A side stand 31 is pivotably mounted on pivot plates 30 provided on front parts of the two rear frames 29 in the vehicle body frame F, the side stand 31 retaining a vehicle body B in a standing state in which it is tilted toward the left side, a front part of the swing arm 22 is swingably supported on the pivot plates 30 via a support shaft 32, and a rear cushion unit 33 is provided, among the two rear frames 29, on the left side, between a rear part of the swing aim 22 and a rear part of the rear frame 29. Furthermore, a main stand 34 is pivotably mounted on the front part of the swing arm 22.

A battery case 37 is disposed between the two under frames 28 so as to be supported by the two under frames 28, the battery case 37 internally including a high voltage battery 36 of for example 72 V for supplying electric power to the electric motor 23, a storage box 38 is disposed between the two rear frames 29 so as to be supported by the two rear frames 29, the storage box 38 being disposed above the swing arm 22 and beneath a riding seat 39 provided in a substantially central portion along the fore-and-after direction of the vehicle body B, and this storage box 38 is covered from above by the riding seat 39, which can be opened and closed. Moreover, a battery housing portion 38a housing a low voltage battery 40 is integrally formed with a rear lower part of the storage box 38 so as to protrude downward, the low voltage battery 40 supplying electric power with a low voltage, for example 12 V, to accessories such as for example a headlight 51 or a tail light 52.

The vehicle body frame F is covered by a vehicle body cover 41 made of a synthetic resin forming the vehicle body B together with the vehicle body frame F. The vehicle body cover 41 includes a front cover 42 covering the head pipe 26 from the front, a leg visor shield 43 connected to the front cover 42 so as to cover a leg part of an occupant seated on the riding seat 39 from the front, the low floor 44 connected to a lower part of the leg visor shield 43 for an occupant seated on the riding seat 39 to place their feet and covering the battery case 28 from above, a pair of left and right floor side covers 45 dropping vertically from opposite sides of the low floor 44 so as to cover the two under frames 28 from opposite sides, an under cover 46 providing a connection between lower edges of the two floor side covers 45, a seat lower front cover 47 rising from the rear end of the low floor 44 so as to cover from the front the underneath of the riding seat 39, a pair of left and right side covers 48 connected to opposite sides of the seat lower front cover 47 so as to cover from opposite sides the underneath of the riding seat 39, and a rear cover 49 connected to the two side covers 48 so as to cover from above the rear wheel WR. The battery case 37 is covered, of sections of the vehicle body cover 41, by the low floor 44, the floor side covers 45, the under cover 46, the seat lower front cover 47, and the side covers 48.

The headlight 51 is disposed at the front end of the front cover 42 so as to be supported by a front stay 50 fixed to the head pipe 26, and the tail light 52 is mounted on the rear frames 29. Furthermore, a front fender 53 disposed beneath the front cover 42 is mounted on the front fork 24 so as to cover the front wheel WF from above, a rear fender 54 covering the rear wheel WR from a position above and to the rear is provided connectedly with the rear cover 49, and a fender 55 covering the rear wheel WR from a position above and to the front is mounted on the front part of the swing arm 22. A central portion of the handlebars 25 is covered by a handle cover 56, a front carrier 57 disposed in front of the front cover 42 is supported by the front stay 50, a luggage tray 58 is provided to the rear of the riding seat 39 and on an upper part of the rear cover 49, and a carrier 59 disposed above the luggage tray 58 is detachably mounted on the rear frames 29.

A cross member 60 straddling a substantially central portion in the fore-and-aft direction of the battery case 37 is provided between the two under frames 28, and the low floor 44 is supported by the cross member 60. Furthermore, a front protecting member 61 protecting a front lower part of the battery case 37 from the front is provided between front parts of the two under frames 28 so that a central portion of the front protecting member 61 is linked to the lower end of the down frame 27, a rear protecting member 62 protecting a rear lower part of the battery case 37 from the rear is provided between rear parts of the two under frames 28, and a plurality of lower protecting members 63 extending in the fore-and-aft direction are provided between the front and rear protecting members 61 and 62 so as to protect the battery case 37 from beneath.

Downstream end parts of a pair of left and right cooling air introduction ducts 64 are connected to a front part of the battery case 37 via connecting tubes 65, and the two cooling air introduction ducts 64 are disposed so as to extend along the down frame 27 so as to sandwich the down frame 27 from opposite sides within the leg visor shield 43. On the other hand, a recess 67 that is recessed forward is formed in the leg visor shield 43 at a position corresponding to a part where the down frame 27 is linked to the head pipe 26, and a lid 68 covering an upper part of the recess 67 is mounted on the leg visor shield 43. An air intake opening 69 is thus formed between the recess 67 and the lower edge of the lid 68, and upstream ends of the two cooling air introduction ducts 64 are connected to the leg visor shield 43 via connecting tubes 66 so as to communicate with the air intake opening 69.

A cooling fan 70 is mounted on a rear upper face of the battery case 37; air taken in via the air intake opening 69 by operation of the cooling fan 70 is introduced into the battery case 37 via the connecting tubes 66, the cooling air introduction ducts 64, and the connecting tubes 65, cools the high voltage battery 36 within the battery case 37, and is discharged to the outside from the battery case 37 by means of the cooling fan 70.

Figure 3:
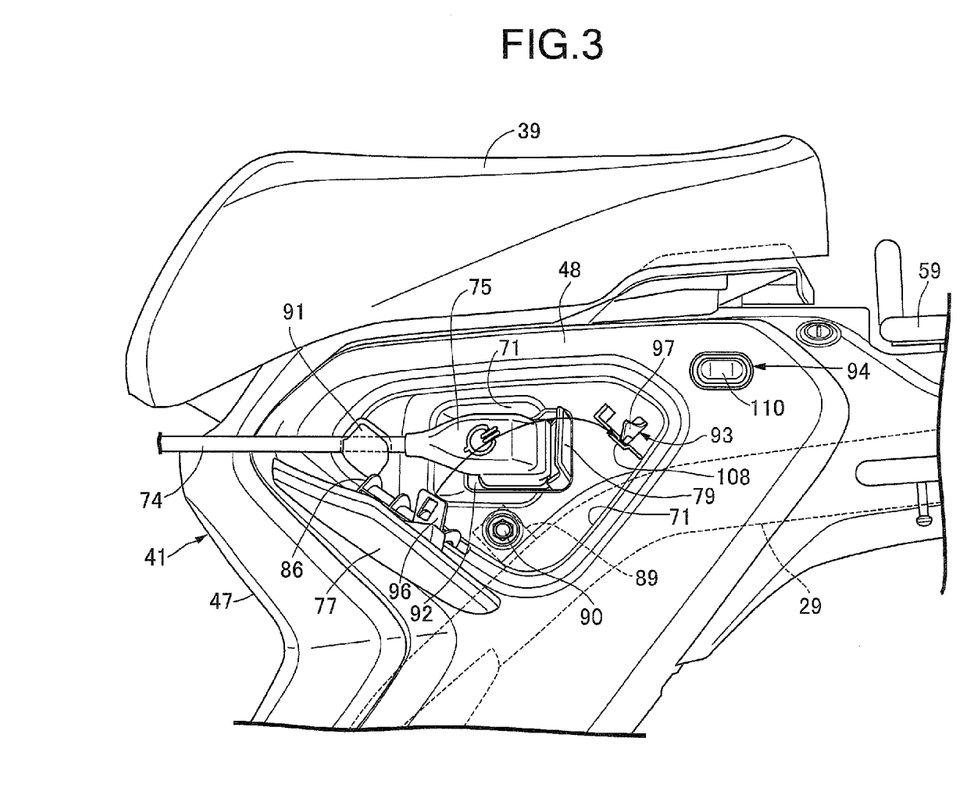
FIG. 3 is an enlarged view of an essential part in FIG. 1 in a charging state with a lid opened. (first embodiment)
Figure 4:
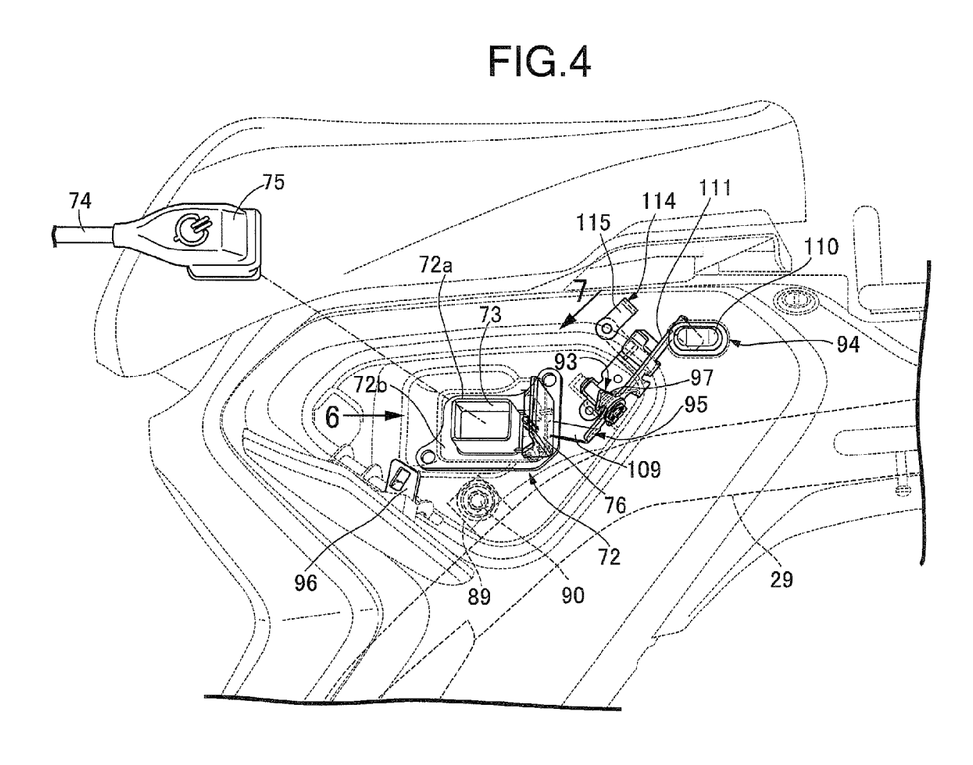
FIG. 4 is a perspective view showing the arrangement of a power supply side connector, a power receiving side connector, retaining means, releasing means, and a link mechanism in a state in which a side cover is omitted. (first embodiment)
Figure 5:
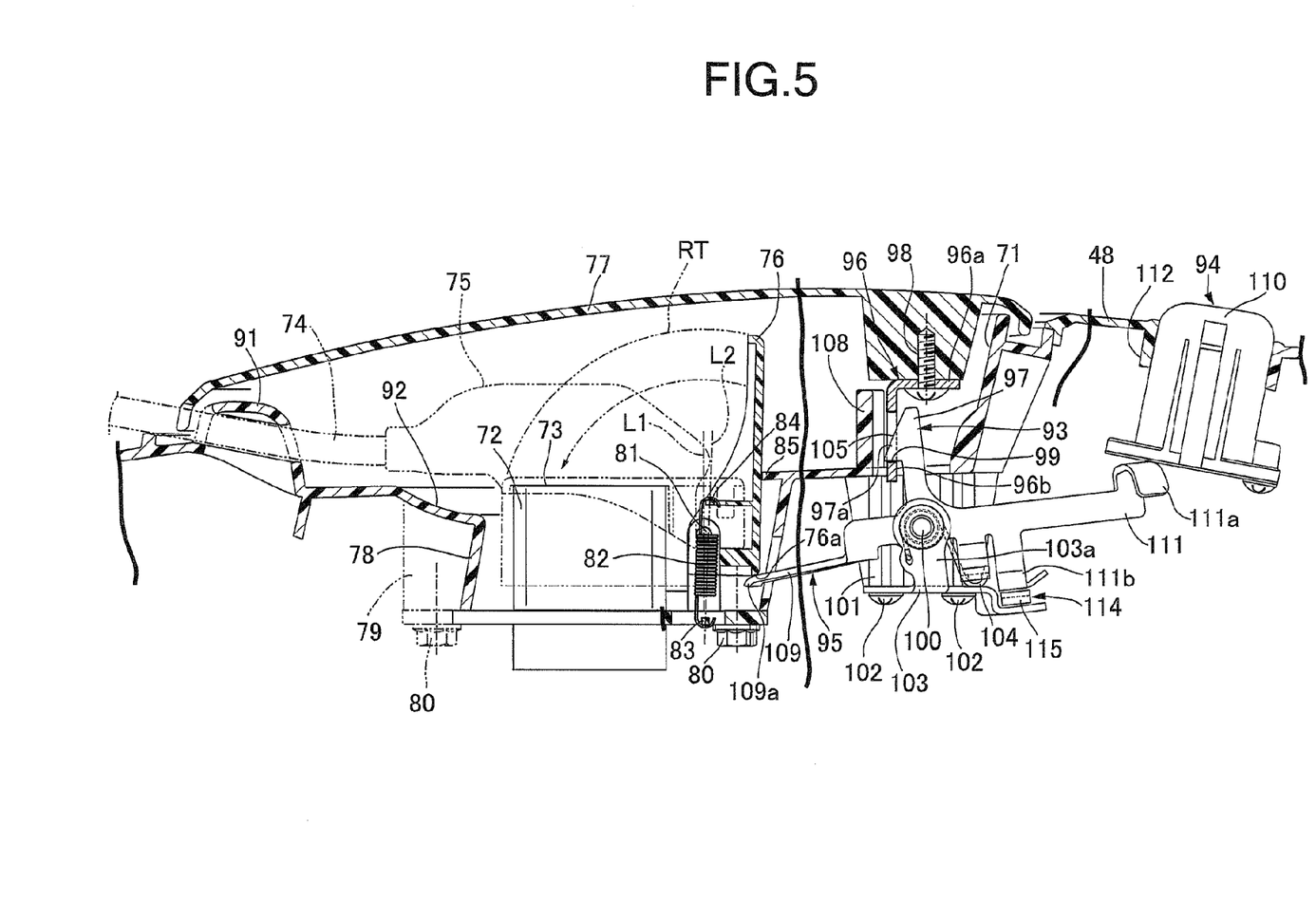
FIG. 5 is an enlarged sectional view along line 5-5 in FIG. 1. (first embodiment)

Referring in addition to FIG. 3 to FIG. 5, a first recess 71 that is recessed inwardly is formed in the left-hand side cover 48, which is a wall member, beneath the riding seat 39, a tubular portion 72a having a rectangular cross-sectional shape of a power receiving side connector 72 for charging the high voltage battery 36 is fixedly disposed within the first recess 71 with its outer end opening as a charging port 73, and a power supply side connector 75 provided on an end part of a charging cable 74 can be fitted onto the tubular portion 72a so as to be freely inserted and removed.

A base end part of a cover member 76 that can close the charging port 73 is pivotably supported by brackets 72c and 72c present at fixed positions adjacent to the tubular portion 72a, and a lid 77 that can close the first recess 71 by covering the cover member 76 from the outside is pivotably supported on the left-hand side cover 48.

The power receiving side connector 72 is formed from a synthetic resin so as to integrally have the tubular portion 72a and a flange portion 72b protruding sideways from the inner end of the tubular portion 72a, a plurality of connecting terminals, which are not illustrated, are disposed in the tubular portion 72a, and a pair of insertion holes 72d and 72d are provided in the flange portion 72b. On the other hand, a housing tubular portion 78 extending inward, that is, toward the storage box 38 side, while having its outer end opening in a central portion of the first recess 71 is integrally provided with the left-hand side cover 48, and bosses 79 extending from a reverse face of the side cover 48 toward the storage box 38 side are integrally provided therewith at two positions sandwiching the housing tubular portion 78 therebetween.

The power receiving side connector 72 is fixed to the reverse face of the left-hand side cover 48 by fastening the flange portion 72b to the bosses 79 by means of bolts 80 and 80 each inserted through the insertion holes 72d in a state in which the tubular portion 72a is housed within the housing tubular portion 78 and the flange portion 72b is abutted against the bosses 79 and the inner end of the housing tubular portion 78.

Moreover, the pair of upper and lower brackets 72c and 72c adjacent to the rear of the tubular portion 72a in the direction of travel of the two-wheeled electric vehicle are integrally provided with the flange portion 72b in the power receiving side connector 72 so as to be disposed within the housing tubular portion 78, and the cover member 76 is pivotably supported on these brackets 72c via first support shafts 81 and 81.

A coil-shaped spring 82 is provided between the cover member 76 and the flange portion 72b of the power receiving side connector 72. One end of the spring 82 is engaged with and linked to a fixed side spring engagement part 83 provided on the flange portion 72b, and the other end of the spring 82 is engaged with and linked to a movable side spring engagement part 84 provided on the cover member 76.

As shown in FIG. 5, a second straight line L2 connecting the fixed side spring engagement part 83 and the movable side spring engagement part 84 is on the right-hand side in FIG. 5 relative to a first straight line L1 passing through the center of the first support shaft 81 and the fixed side spring engagement part 83 in a state in which the cover member 76 is open, and in this state the cover member 76 is urged by means of the spring 82 toward the side on which it is open. On the other hand, when the second straight line L2 moves to the left-hand side of the first straight line L1 partway through pivoting of the cover member 76 toward the side on which it is closed, the cover member 76 is urged by means of the spring 82 toward the side on which it is closed. The cover member 76 urged by means of the spring 82 to the side on which it is open abuts against a stopper 85 projectingly provided at the outer end of the housing tubular portion 78, thus restricting the pivoting end toward the side on which it is open.

The first recess 71 and the lid 77 are formed into a substantially triangular shape having one apex at a lower position, and the lid 77 is pivotably supported on the left-hand side cover 48 via a portion corresponding, among the three sides forming the triangle, to the side positioned forward in the direction of travel of the two-wheeled electric vehicle. That is, an arm portion 86 inserted from a front part of the open end of the first recess 71 toward the side cover 48 reverse face side is integrally provided with the lid 77, and the arm portion 86 is pivotably supported on the side cover 48 reverse face side via a second support shaft 87. Furthermore, provided between the side cover 48 and the lid 77 is a spring 88 urging the lid 77 toward the side on which it is open.

Moreover, the relative positions of the cover member 76 and the lid 77 are set as shown in FIG. 5 such that a pivot trajectory RT of an extremity part of the cover member 76 does not overlap the lid 77 in a closed state.

The side cover 48 is supported via a plurality of positions on the rear frame 29 of the vehicle body frame F, and at least one of the plurality of supporting positions is stay 89 wherein the side cover 48 is supported on the rear frame 29 is set and disposed in the vicinity of the charging port 73 within the first recess 71. That is, as clearly shown by FIG. 3 and FIG. 4, at least one stay 89 positioned beneath the tubular portion 72a within the first recess 71 when viewed from the side is fixed to the rear frame 29, and the side cover 48 is fastened to the at least one stay 89 via a bolt 90 disposed within the first recess 71.

Furthermore, a cable hanger 91 that detachably retains the charging cable 74 is provided in a portion of the first recess 71 that is spaced from the charging port 73, in this embodiment in a peripheral part of the first recess 71 in front of the tubular portion 72a. This cable hanger 91 is formed such that the cross-sectional shape is substantially U-shaped and opens upward, and inserting the charging cable 74 into the cable hanger 91 from above enables the charging cable 74 to be retained resiliently. In this embodiment the cable hanger 91 is integrally provided with the side cover 48, but a cable hanger that is a separate body from the side cover 48 may be fixedly provided in the peripheral part of the first recess 71.

Moreover, a second recess 92 that is recessed further inward from the first recess 71 is formed on the periphery of the tubular portion 72a, and in this embodiment this second recess 92 is made into a substantially U-shaped form so as to surround the tubular portion 72a from the front, above, and beneath.

Figure 6:
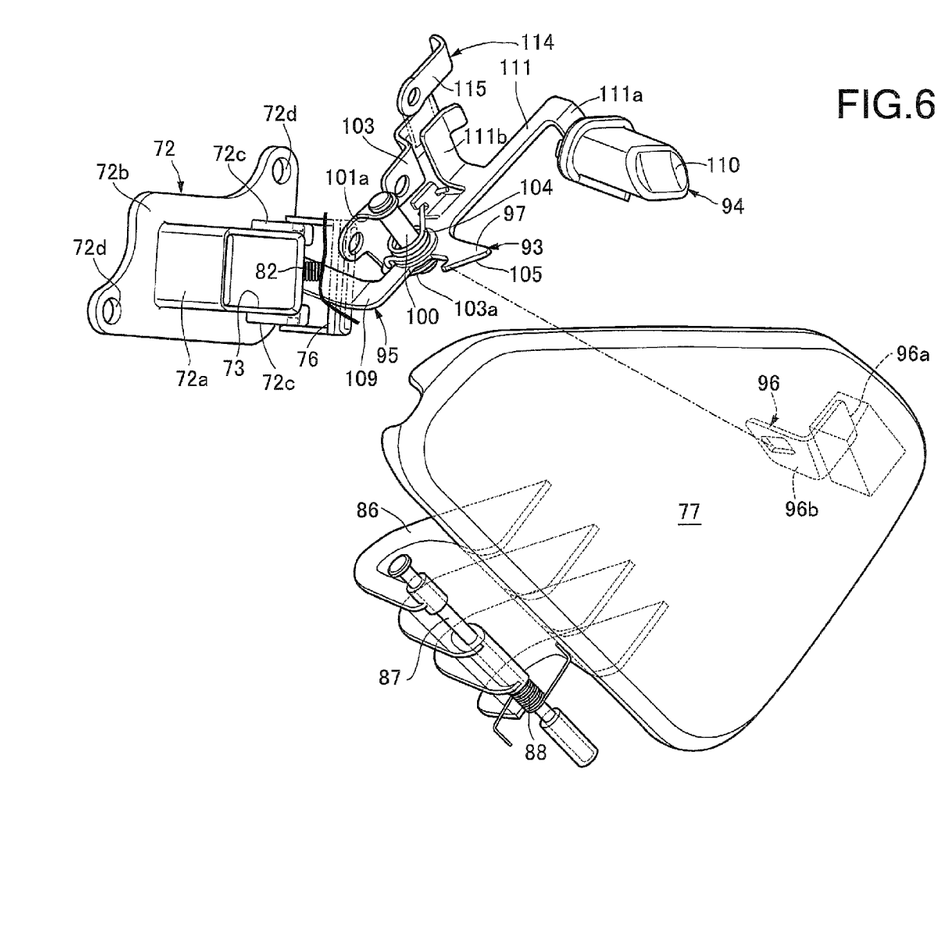
FIG. 6 is a perspective view of the lid, the power receiving side connector, the retaining means, the releasing means, and the link mechanism when viewed from the direction shown by arrow 6 in FIG. 4. (first embodiment)
Figure 7:
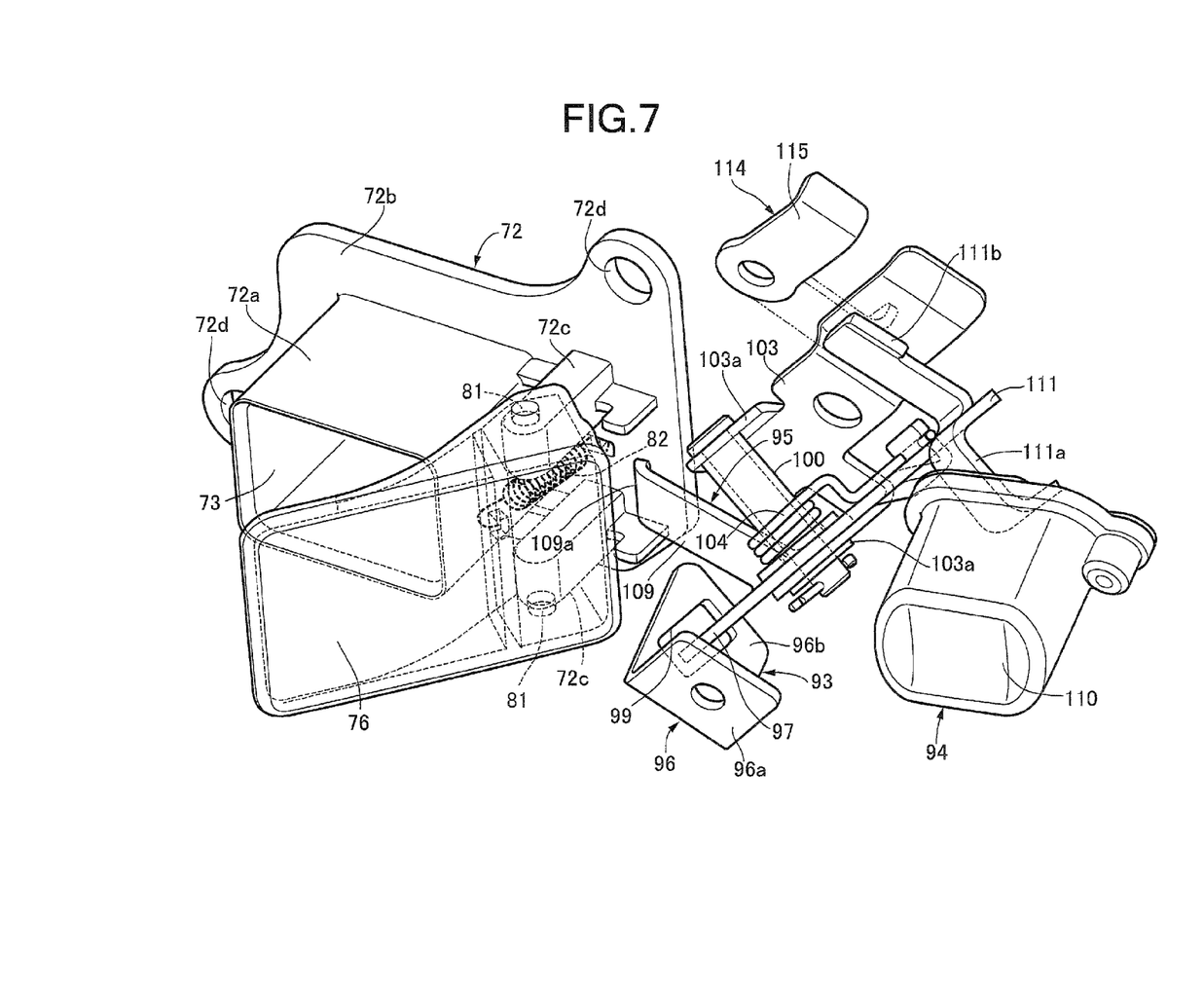
FIG. 7 is a perspective view of the power receiving side connector, the retaining means, the releasing means, and the link mechanism when viewed from the direction shown by arrow 7 in FIG. 4. (first embodiment)

Referring in addition to FIG. 6 and FIG. 7, the closed state of the lid 77 is retained by retaining means 93 that operates in response to the lid 77 pivoting from the open position to the closed position, and retention of the closed state of the lid 77 by the retaining means 93 can be released by operation of releasing means 94. Furthermore, the cover member 76 is pivoted to the closing side by a mechanical link mechanism 95, which is coupling means that operates in association with operation of the retaining means 93 when closing the lid 77.

The retaining means 93 is formed from a catcher 96 mounted on an inner face of the lid 77 and a hook 97 pivotably supported on the left-hand side cover 48 so as to engage with the catcher 96 in response to closing of the lid 77.

The catcher 96 is made into a substantially L-shaped form integrally having a mounting plate portion 96a secured to the inner face of the lid 77 by means of a screw member 98 and a projecting plate portion 96b connectedly provided at right angles to one end of the mounting plate portion 96a so as to protrude from the inner face of the lid 77, and a latching hole 99 is formed in the projecting plate portion 96b. On the other hand, the hook 97, which has in an extremity part a claw portion 97a that can engage with the latching hole 99, is pivotably supported on the side cover 48 side via a third support shaft 100. That is, a plurality of bosses 101 are projectingly provided on the reverse face of the side cover 48 to the rear of the housing tubular portion 78, a support plate 103 is fastened to these bosses 101 by means of screw members 102, and a base of the hook 97 is pivotably supported via the third support shaft 100 on brackets 103a and 103a projectingly provided integrally with the support plate 103.

Moreover, one end of a torsion spring 104 surrounding the third support shaft 100 is engaged with the hook 97, the other end of the torsion spring 104 is engaged with the support plate 103, and the hook 97 is pivotingly urged toward the side on which the claw portion 97a is engaged with the latching hole 99 of the catcher 96 by virtue of a spring force exhibited by the torsion spring 104.

Figure 8:
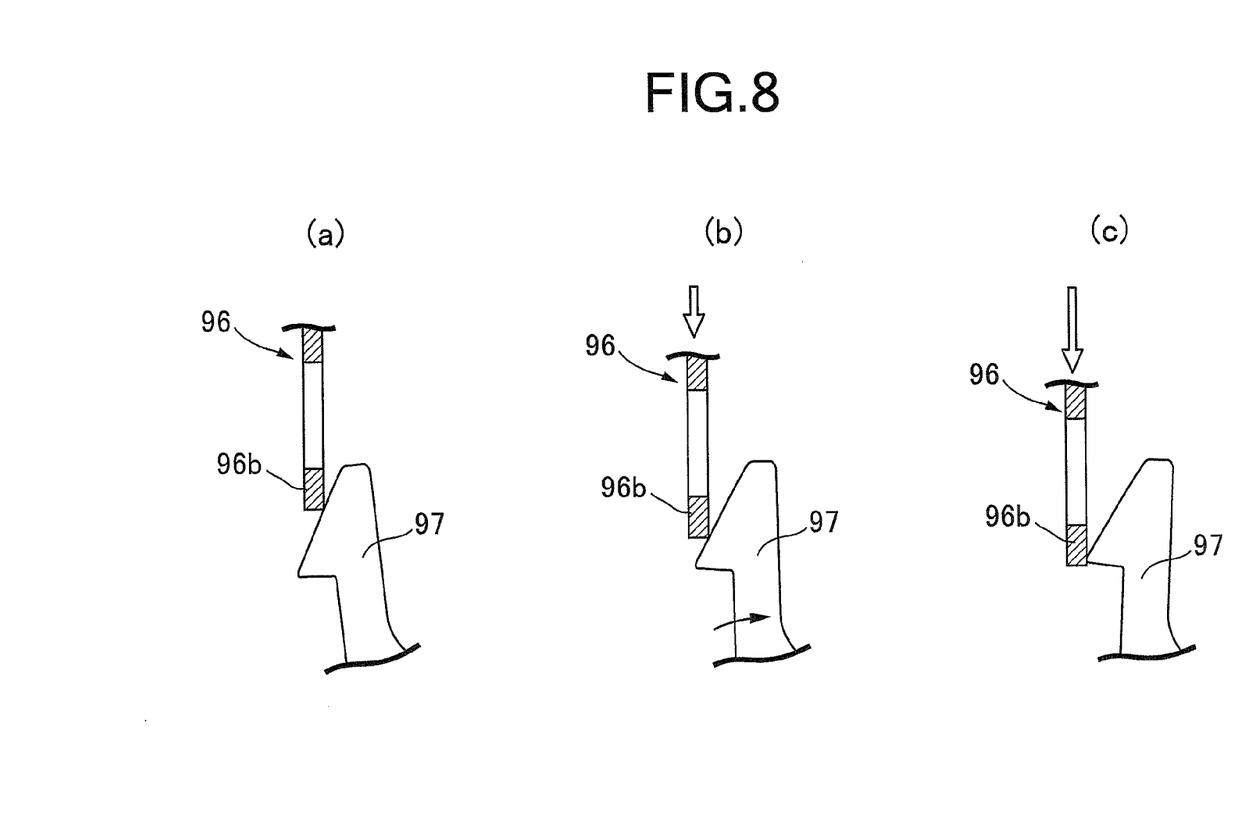
FIG. 8 is a diagram showing operational states of the retaining means in sequence. (first embodiment)

An inclined face 105 is formed on a side face of the extremity part of the hook 97 on the projecting plate portion 96b side in the catcher 96, the inclined face 105 being inclined so as to go away from the projecting plate portion 96b in going toward the extremity side. When the lid 77 in the open state is pivoted toward the closing side, first as shown in FIG. 8 (a) the extremity of the projecting plate portion 96b of the catcher 96 abuts against the inclined face 105, when the lid 77 is pivoted further toward the closing side, as shown in FIG. 8 (b) the extremity of the projecting plate portion 96b comes into sliding contact with the inclined face 105 so as to pivot the hook 97 against the spring force of the torsion spring 104, and when the latching hole 99 of the projecting plate portion 96b is moved to a position corresponding to the claw portion 97a of the extremity part of the hook 97 by pivoting the lid 77 further toward the closing side after as shown in FIG. 8 (c) the extremity of the projecting plate portion 96b goes past the inclined face 105, the hook 97 is pivoted by means of the spring force of the torsion spring 104 toward the side on which the claw portion 97a engages with the latching hole 99 of the projecting plate portion 96b. That is, the hook 97 of the retaining means 93 pivots in response to pivoting of the lid 77 from the open position to the closed position, first pivots in the clockwise direction in FIG. 5, and then pivots in the anticlockwise direction so as to engage with the latching hole 99, thus retaining the closed state of the lid 77.

Furthermore, a guide part 108 for guiding movement of the catcher 96 into the interior of the first recess 71 is provided on the side cover 48 within the first recess 71, and this guide part 108 is projectingly provided integrally with the side cover 48 so as to face the projecting plate portion 96b of the catcher 96 from the side opposite to the hook 97.

The link mechanism 95 is formed from the hook 97, which is a movable part that forms part of the retaining means 93 and operates in response to pivoting of the lid 77 toward the closing side, and a first link 109 that pivots the cover member 76 toward the closing side in response to operation of the hook 97 when closing the lid 77, and one end of the first link 109 is connectedly provided integrally with the base of the hook 97.

The first link 109 extends from the third support shaft 100 toward the cover member 76 side, and an abutment portion 109a that abuts against a pressure-receiving portion 76a provided on the base of the cover member 76 is provided at the extremity of the first link 109. The abutment portion 109a of the first link 109 in a state in which the cover member 76 is at the open position abuts against the pressure-receiving portion 76a of the cover member 76 as shown in FIG. 5; when the hook 97 is pushed by the projecting plate portion 96b of the catcher 96 and pivots in the clockwise direction in FIG. 5 when closing the lid 77, the first link 109 pivots in the clockwise direction in FIG. 5 together with the hook 97, and a pressing force is applied from the abutment portion 109a to the pressure-receiving portion 76a of the cover member 76 so as to pivot the cover member 76 in the anticlockwise direction in FIG. 5 around the axis of the first support shaft 81. When the cover member 76 pivots by virtue of the pressing force from the abutment portion 109a until the second straight line L2 connecting the fixed side spring engagement part 83 and the movable side spring engagement part 84 moves, relative to the first straight line L1 passing through the fixed side spring engagement part 83 and the center of the first support shaft 81, to the left side of the first straight line L1 in FIG. 5, the cover member 76 pivots toward the closing side by virtue of the urging force due to the spring 82.

The releasing means 94 is formed from a push button 110 that is supported on the side cover 48 so that it can be pushed in and a second link 111 that transmits toward the hook 97 side a force due to a pushing-in operation of the push button 110.

A slide tube 112 extending inward from the left-hand side cover 48 (see FIG. 5) is integrally provided with the side cover 48 at a position in which it is adjacent to the first recess 71 from the rear, and the push button 110 is slidably fitted into the slide tube 112 so as not to fall out from the side cover 48 to the outside. In this way, since the push button 110 forming part of the releasing means 94, which can release retention of the closed state of the lid 77 by the retaining means 93, is disposed in the vicinity of the first recess 71, operation of the releasing means 94 by a user becomes easy, thus enhancing the workability.

On the other hand, one end of the second link 111 is connectedly provided integrally with the base of the hook 97. That is, the hook 97, the first link 109, and the second link 111 are formed as a unit.

The second link 111 extends from the third support shaft 100 toward the push button 110 side, and a receiving portion 111a that abuts against an inner end of the push button 110 is provided at the extremity of the second link 111. When the push button 110 is pushed in while the lid 77 is in a closed state and the closed state of the lid 77 is retained by the retaining means 93, the second link 111 pivots in the clockwise direction in FIG. 5 around the axis of the third support shaft 100, the hook 97 pivots toward the side on which the claw portion 97a is disengaged from the latching hole 99 of the catcher 96, and retention of the closed state of the lid 77 by the retaining means 93 is thus released.

Pivoting of the second link 111 in which the second link 111 is pivoted to the side on which retention of the closed state of the lid 77 by the retaining means 93 is released can be restricted by restricting means 114. This restricting means 114 includes a pivoting restricting arm 115 that is pivotably supported on the storage box 38 so that it can pivot within the storage box 38. A restricting projection portion 111b that abuts against the pivoting restricting aim 115 that has pivoted to a position shown by a chain line in FIG. 6 and FIG. 7 is integrally provided with the second link 111, and pivoting of the second link 111 toward the side on which retention of the closed state of the lid 77 is released is restricted by the restricting projection portion 111b abutting against the pivoting restricting arm 115.

The operation of this embodiment is now explained. The retaining means 93, which operates in response to closing of the lid 77, retains the closed state of the lid 77, and retention of the closed state of the lid 77 by the retaining means 93 can be released by operation of the releasing means 94; moreover, since the cover member 76 is pivoted toward the closing side by the mechanical link mechanism 95 operating in association with operation of the retaining means 93 when closing the lid 77, it is possible to prevent closing of the lid 77 from being forgotten. Furthermore, since the lid 77 and the cover member 76 do not abut directly against each other and transmit a force, it is unnecessary to subject the cover member 76 and the lid 77 to a surface treatment, etc., thus reducing the cost.

Furthermore, since the relative positions of the cover member 76 and the lid 77 are set so that the pivot trajectory RT of the extremity part of the cover member 76 does not overlap the lid 77 in a closed state, when carrying out charging by means of the charging cable 74 by opening the cover member 76, it is possible to carry out a charging operation while closing the lid 77, and it is possible to prevent rain water, etc. from splashing over the charging port 73 while charging.

Moreover, since the link mechanism 95 is formed mechanically with as a component the hook 97, which is part of the retaining means 93, it is possible to form the charging port structure with lower cost.

Furthermore, the link mechanism 95 is formed from the hook 97, which forms part of the retaining means 93 and operates in response to pivoting of the lid 77 toward the closing side, and the first link 109, which pivots the cover member 76 toward the closing side in response to operation of the hook 97 when closing the lid 77, the releasing means 94 is formed from the push button 110, which is supported on the left-hand side cover 48 so that it can be pushed in, and the second link 111, which transmits a force due to a pushing-in operation of the push button 110 toward the hook 97 side, and the hook 97, the first link 109, and the second link 111, which operate in association with each other, are formed in an integrally connected manner, therefore making it possible to form the charging port structure with an even lower cost.

Moreover, since the first recess 71 having the charging port 73 disposed therein is provided in the side cover 48 so as to be recessed inwardly, the side cover 48 covering from the side the storage box 38 fixedly disposed beneath the riding seat 39 provided on a substantially central portion along the fore-and-aft direction of the vehicle body B, a charging port structure that requires a relatively large space may be disposed by utilizing a space on the side of the storage box 38 and, moreover, it is possible to avoid the charging port structure from protruding outward greatly from the side cover 48.

Furthermore, since the cable hanger 91, which detachably retains the charging cable 74, is provided in a portion of the first recess 71 spaced from the charging port 73, it is possible to reduce the weight imposed on the tubular portion 72a from the charging cable 74 while carrying out a charging operation with the charging cable 74, thus enabling the tubular portion 72a to be formed from an inexpensive member and thereby reducing the cost.

Moreover, since the second recess 92, which is recessed further inward from the first recess 71, is formed on the periphery of the charging port 73, it is possible to carry out removal and insertion of the connecting terminal of the charging cable 74 by utilizing the second recess 92, thus improving the operability of charging.

Furthermore, since the retaining means 93 is formed from the catcher 96, which is mounted on the inner face of the lid 77, and the hook 97, which is pivotably supported on the side cover 48 so as to engage with the catcher 96 in response to closing of the lid 77, and the guide part 108, which guides movement of the catcher 96 into the first recess 71, is provided on the side cover 48, it is possible to prevent a situation in which the hook 97 becomes inoperable when closing the lid 77 as a result of the catcher 96 slipping under the hook 97 due to flexure of the lid 77 allowing the hook 97 to be engaged without making the hook 97 pivot and it is possible to prevent the catcher 96 from slipping under when closing the lid 77, thus guaranteeing reliable operation of the retaining means 93 by making the hook 97 operate by reliable engagement with the catcher 96.

Moreover, since one of the plurality of supporting positions supporting the side cover 48 on the vehicle body frame F is set and disposed in the vicinity of the charging port 73 within the first recess 71, it is possible to prevent the side cover 48 from flexing when carrying out removal and insertion of the connecting terminal on the charging cable 74 side, thus enabling the removal and insertion operations to be carried out smoothly.

An embodiment of the present invention is explained above, but the present invention is not limited to the above-mentioned embodiment and may be modified in a variety of ways as long as the modifications do not depart from the spirit and scope thereof.

For example, in the above-mentioned embodiment a case in which the present invention is applied to a two-wheeled electric vehicle is explained, but the present invention may be applied to a three-wheeled electric vehicle.

The invention claimed is:

1. A charging port structure comprising:
a charging port fixedly disposed within a recess provided in a wall member;
a base end part of a cover member, capable of closing the charging port, is pivotably supported at a position adjacent to the charging port;
a lid capable of closing the recess so as to cover the cover member from the outside is pivotably supported on the wall member;
wherein the charging port structure including a retainer operable in response to the lid being closed to retain a closed state of the lid;
a releasing mechanism operable so as to release the retention of the closed state of the lid by the retainer; and
a coupler operable in association with operation of the retainer when closing the lid to pivot the cover member toward a closed position of the cover member,
wherein the relative positions of the cover member and the lid are set so that the pivot trajectory of an extremity part of the cover member does not touch or interfere with the lid in the closed state.

2. The charging port structure according to claim 1, wherein the coupler is formed as a mechanical link mechanism with part of the retainer as a component.

3. The charging port structure according to claim 2, wherein the link mechanism is formed from a movable part that forms part of the retainer and operates in response to pivoting of the lid toward the closing side, and a first link that pivots the cover member toward the closing side in response to operation of the movable part when closing the lid, the releasing mechanism is formed from a push button that is supported on the wall member so that the push button can be pushed, and a second link that transmits toward the movable part side a force due to a pushing-in operation of the push button, and the movable part, the first link, and the second link are connectedly formed as a unit.

4. A straddled vehicle equipped with the charging port structure according to claim 1, wherein the straddled vehicle comprising a storage box fixedly disposed beneath a riding seat provided in a substantially central portion along the fore-and-aft direction of a vehicle body, and a side cover as the wall member covering the storage box from the side, wherein the recess is provided on the side cover so as to be recessed inwardly.

5. The straddled vehicle according to claim 4, wherein a cable hanger detachably retaining a charging cable is provided in a portion of the recess that is spaced from the charging port.

6. The straddled vehicle according to claim 4, wherein a second recess is formed on the periphery of the charging port, the second recess being recessed further inward from the recess.

7. The straddled vehicle according to claim 4, wherein the retainer is formed from a catcher that is mounted on an inner face of the lid, and a hook that is pivotably supported on the side cover so as to engage with the catcher in response to closing of the lid, and a guide part for guiding movement of the catcher into the interior of the recess is provided on the side cover.

8. The straddled vehicle according to claim 4, wherein at least one supporting position supports the side cover on a vehicle body frame is set and disposed in the vicinity of the charging port within the recess.

9. A straddled vehicle equipped with the charging port structure according to claim 2, wherein the straddled vehicle comprising a storage box fixedly disposed beneath a riding seat provided in a substantially central portion along the fore-and-aft direction of a vehicle body, and a side cover as the wall member covering the storage box from the side, wherein the recess is provided on the side cover so as to be recessed inwardly.

10. A straddled vehicle equipped with the charging port structure according to claim 3, wherein the straddled vehicle comprising a storage box fixedly disposed beneath a riding seat provided in a substantially central portion along the fore-and-aft direction of a vehicle body, and a side cover as the wall member covering the storage box from the side, wherein the recess is provided on the side cover so as to be recessed inwardly.

11. A straddled vehicle equipped with a charging port structure comprising:
- a charging port fixedly disposed within a recess provided in a wall member;
- a base end part of a cover member, capable of closing the charging port, is pivotably supported at a position adjacent to the charging port;
- a lid capable of closing the recess so as to cover the cover member from the outside is pivotably supported on the wall member;
- wherein the charging port structure including a retainer operable in response to the lid being closed to retain a closed state of the lid;
- a releasing mechanism operable so as to release the retention of the closed state of the lid by the retainer; and
- a coupler operable in association with operation of the retainer when closing the lid to pivot the cover member toward a closed position of the cover member,
- wherein the relative positions of the cover member and the lid are set so that the pivot trajectory of an extremity part of the cover member does not overlap the lid in the closed state,
- wherein the straddled vehicle includes a storage box fixedly disposed beneath a riding seat provided in a substantially central portion along the fore-and-aft direction of a vehicle body, and a side cover as the wall member covering the storage box from the side, wherein the recess is provided on the side cover so as to be recessed inwardly.

12. A straddled vehicle equipped with a charging port structure comprising:
- a charging port fixedly disposed within a recess provided in a wall member;
- a base end part of a cover member, capable of closing the charging port, is pivotably supported at a position adjacent to the charging port;
- a lid capable of closing the recess so as to cover the cover member from the outside is pivotably supported on the wall member;
- wherein the charging port structure including a retainer operable in response to the lid being closed to retain a closed state of the lid;
- a releasing mechanism operable so as to release the retention of the closed state of the lid by the retainer; and
- a coupler operable in association with operation of the retainer when closing the lid to pivot the cover member toward a closed position of the cover member, said coupler being formed as a mechanical link mechanism with part of the retainer as a component,
- wherein the relative positions of the cover member and the lid are set so that the pivot trajectory of an extremity part of the cover member does not overlap the lid in the closed state,
- wherein the straddled vehicle includes a storage box fixedly disposed beneath a riding seat provided in a substantially central portion along the fore-and-aft direction of a vehicle body, and a side cover as the wall member covering the storage box from the side, wherein the recess is provided on the side cover so as to be recessed inwardly.

* * * * *